US011210684B1

(12) United States Patent
Garg et al.

(10) Patent No.: US 11,210,684 B1
(45) Date of Patent: Dec. 28, 2021

(54) ACCURATELY ESTIMATING CAUSAL EFFECTS FOR RELATED EVENTS

(71) Applicant: Amazon Technologies, Inc., Seattle, WA (US)

(72) Inventors: Pranav Garg, Bangalore (IN); Vineet Shashikant Chaoji, Bangalore (IN); Karthik Sundaresan Gurumoorthy, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 426 days.

(21) Appl. No.: 15/873,692

(22) Filed: Jan. 17, 2018

(51) Int. Cl.
G06Q 30/02 (2012.01)
G06F 17/18 (2006.01)
G06Q 10/04 (2012.01)

(52) U.S. Cl.
CPC ......... G06Q 30/0202 (2013.01); G06F 17/18 (2013.01); G06Q 10/04 (2013.01); G06Q 30/0201 (2013.01); *G06Q 30/0253* (2013.01)

(58) Field of Classification Search
CPC ............... G06Q 30/0202; G06Q 10/04; G06Q 30/0201; G06Q 30/0253; G06F 17/18; G06F 11/3452; G06F 11/3495; G06F 16/24578; G06F 16/2468; G06F 16/285
See application file for complete search history.

(56) References Cited

U.S. PATENT DOCUMENTS

| | | | | |
|---|---|---|---|---|
| 6,008,817 | A * | 12/1999 | Gilmore, Jr. .......... | G06T 11/206 345/440 |
| 6,609,109 | B1 * | 8/2003 | Bradley ................. | G06Q 40/00 705/35 |
| 7,870,474 | B2 * | 1/2011 | Chakrabarti .......... | G06F 16/958 715/205 |
| 8,275,656 | B2 | 9/2012 | Cetin | |
| 8,370,394 | B2 * | 2/2013 | Atta .................. | G06F 16/24532 707/797 |
| 8,650,187 | B2 | 2/2014 | Chen et al. | |
| 9,210,057 | B2 | 12/2015 | Biazetti et al. | |
| 9,285,908 | B2 | 3/2016 | Moore et al. | |
| 9,443,002 | B1 | 9/2016 | Freese et al. | |
| 2010/0106561 | A1 * | 4/2010 | Peredriy ................ | G06Q 10/04 705/7.31 |

(Continued)

OTHER PUBLICATIONS

Zhang H., Petitjean F., Buntine W. (2020) Hierarchical Gradient Smoothing for Probability Estimation Trees. In: Lauw H., Wong RW., Ntoulas A., Lim EP., Ng SK., Pan S. (eds) Advances in Knowledge Discovery and Data Mining. PAKDD 2020. Lecture Notes in Computer Science, vol. 12084. Springer, Cham. (Year: 2020).*

(Continued)

*Primary Examiner* — Eric R Netzloff
(74) *Attorney, Agent, or Firm* — Robert C. Kowert; Kowert, Hood, Munyon, Rankin & Goetzel, P.C.

(57) ABSTRACT

Methods, systems, and computer-readable media for accurately estimating causal effects for related events are disclosed. A plurality of estimates of causal effects of events are determined. The estimates are determined independently. A subset of the estimates are determined not to satisfy a relationship among the causal effects. A set of accurate estimates are generated based at least in part on the subset of the estimates. The accurate estimates are generated using a smoothing process, and the accurate estimates satisfy the relationship.

20 Claims, 8 Drawing Sheets

(56) References Cited

U.S. PATENT DOCUMENTS

| | | | | |
|---|---|---|---|---|
| 2011/0225042 | A1* | 9/2011 | Cetin | G06Q 30/00 |
| | | | | 705/14.52 |
| 2012/0089609 | A1* | 4/2012 | Trovero | G06Q 30/0201 |
| | | | | 707/738 |
| 2014/0337359 | A1* | 11/2014 | Airoldi | G06F 16/24578 |
| | | | | 707/748 |
| 2017/0278053 | A1* | 9/2017 | High | G06Q 10/087 |
| 2018/0268444 | A1* | 9/2018 | Dong | G06F 16/951 |
| 2018/0329990 | A1* | 11/2018 | Severn | G06K 9/6274 |
| 2019/0243856 | A1* | 8/2019 | Paaske | G06F 16/322 |

OTHER PUBLICATIONS

J. Hao and K. Zhang, "A Mobile Interface for Hierarchical Information Visualization and Navigation," 2007 IEEE International Symposium on Consumer Electronics, 2007, pp. 1-7, doi: 10.1109/ISCE.2007.4382214. (Year: 2007).*

Hang Cui and O. R. Zaine, "Hierarchical structural approach to improving the browsability of Web search engine results," 12th International Workshop on Database and Expert Systems Applications, 2001, pp. 956-960, doi: 10.1109/DEXA.2001.953178. (Year: 2001).*

C. Lofi, C. Nieke and W. Balke, "Mobile Product Browsing Using Bayesian Retrieval," 2010 IEEE 12th Conference on Commerce and Enterprise Computing, 2010, pp. 96-103, doi: 10.1109/CEC.2010.19. (Year: 2010).*

\* cited by examiner

ACCURATELY ESTIMATING CAUSAL EFFECTS FOR RELATED EVENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogs of items offered for sale. For each item offered for sale, such electronic catalogs typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to generate a product detail page or process an order placed by a consumer for one or more items in the catalog.

Figure 1:
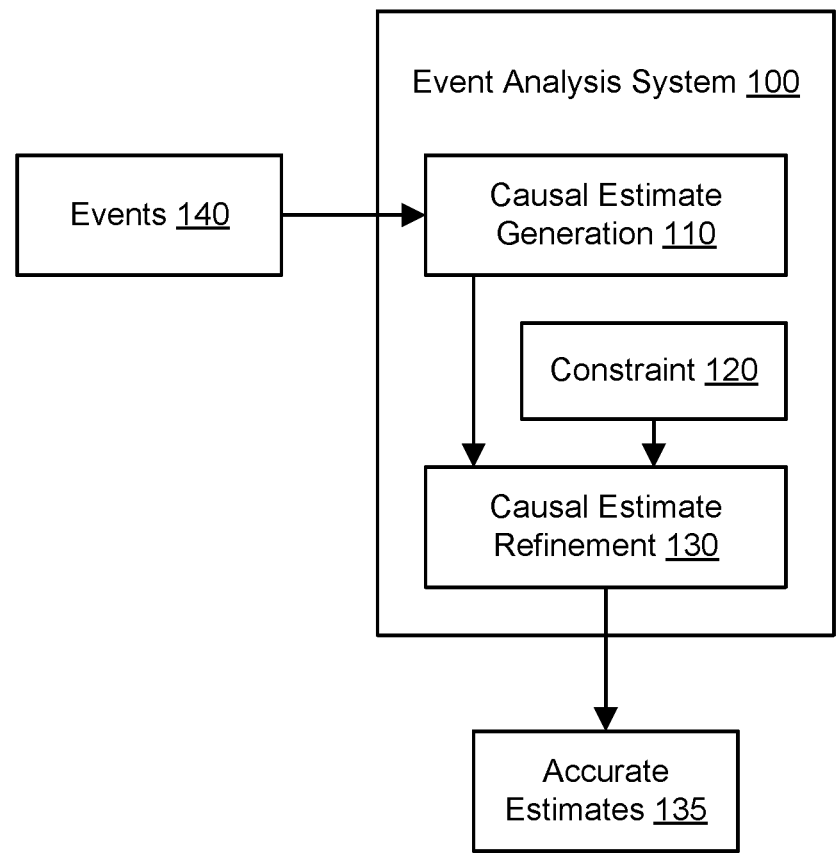
FIG. 1 illustrates an example system environment for accurately estimating causal effects for related events, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for accurately estimating causal effects for related events are described. Using the techniques described herein, the causal effects of multiple related events may be estimated in an accurate manner such that a relationship among the causal effects is satisfied. The causal effects may be estimated independently of one another, and an adjustment may be applied for any estimates that do not initially satisfy the relationship in order to turn inaccurate and invalid estimates into accurate and valid estimates. Inaccuracies in initial estimates may be due to various sources of bias, such as the presence of unobserved latent covariates, implementation-specific modeling choices such as the selection of the control from the larger set of the control population, propensity modeling, and so on. The relationship may represent a constraint on the estimation process. If the relationship is derived from the positions of nodes in a tree (or other hierarchical structure), then estimates of causal effects for individual nodes may be expected to satisfy that relationship, e.g., such that a valid estimate for a parent node represents a weighted average of the estimates for child nodes. The adjustment of inaccurate estimates to accurate ones may be performed using a Bayesian smoothing process. The initial estimates may be assumed to be a sample drawn from a Gaussian distribution centered on the valid estimates (whose expected value satisfies the constraint). To produce accurate estimates, the estimates may be moved within a Gaussian distribution until the constraint is met. The accurate estimates of causal effects may be used by other systems, e.g., as associated with an online marketplace that offers items for sale to customers. For example, if the underlying events involve purchases of items for browse nodes in a hierarchy of nodes, then the downstream impact of those purchases may be accurately estimated such that a relationship associated with the hierarchy is met. The estimates of downstream impact may then be used to affect operation of the marketplace such as inventory management, search results, or marketing. Using the techniques described herein, estimates of causal effects for related events may be determined in a manner that makes efficient use of computing resources and such that the accuracy of the output is improved.

FIG. 1 illustrates an example system environment for accurately estimating causal effects for related events, according to one embodiment. An event analysis system 100 may produce accurate estimates 135 of causal effects for multiple related events 140. Using the event analysis system 100, the causal effects of multiple related events may be estimated in an accurate manner such that a relationship among the causal effects is satisfied. The relationship may represent a constraint 120 on the estimation process, such that accurate or valid estimates of causal effects are expected to meet the constraint. For example, if the constraint 120 is derived from the positions of nodes in a tree (or other hierarchical structure), then estimates of causal effects for individual nodes may be expected to satisfy that hierarchical relationship, e.g., such that a valid estimate for a parent node represents a weighted average of the estimates for child nodes. In one embodiment, the constraint 120 may be specified by a user, e.g., a user who seeks to invoke the functionality of the event analysis system 100 to produce accurate estimates 135. In one embodiment, the constraint 120 may be determined using a machine learning process.

The event analysis system 100 may include a component for causal estimate generation 110. The event analysis system 100 may also include a component for causal estimate refinement 130. The component for causal estimate generation 110 may determine initial estimates of causal effects for the events 140. The component for causal estimate refinement 130 may then produce adjusted estimates 135 for at least some of the initial estimates of causal effects. The adjusted estimates 135 may have improved accuracy with respect to the initial estimates and may be referred to as accurate estimates. The accurate estimates 135 may be considered valid estimates that correspond to invalid estimates produced by the component for causal estimate generation 110. In one embodiment, estimates produced by the component for causal estimate generation 110 that meet the constraint 120 may not be subjected to further processing by the component for causal estimate refinement 130 and may be provided as output with the accurate estimates 135.

The causal effects may be estimated independently of one another by the component for causal estimate generation 110. Using the component for causal estimate refinement 130, an adjustment may be applied for any estimates that do not initially satisfy the relationship in order to turn inaccurate and invalid estimates into accurate and valid estimates. Inaccuracies in initial estimates may be due to various sources of bias, such as the presence of unobserved latent covariates, implementation-specific modeling choices such as the selection of the control from the larger set of the control population, propensity modeling, and so on. Using the component for causal estimate refinement 130, the adjustment of inaccurate estimates to accurate ones may be performed using a Bayesian smoothing process. The initial estimates may be assumed to be a sample drawn from a Gaussian distribution centered on the valid estimates (whose expected value satisfies the constraint). To produce accurate estimates 135, the values may be moved within a Gaussian distribution until the constraint 120 is met.

Figure 8:
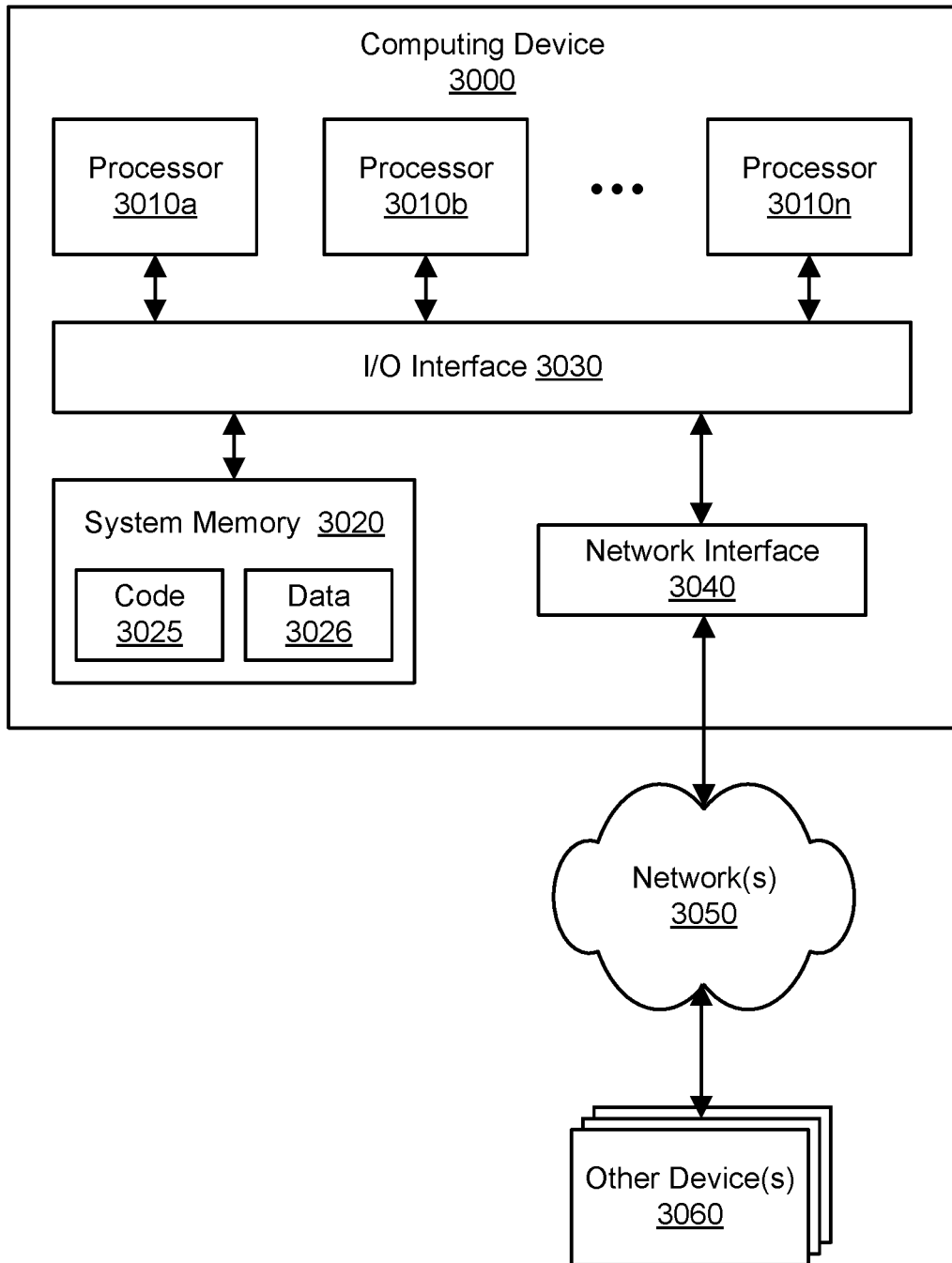
FIG. 8 illustrates an example computing device that may be used in some embodiments.

The event analysis system 100 may include one or more computing devices, any of which may be implemented by the example computing device 3000 illustrated in FIG. 8. In various embodiments, portions of the described functionality of the event analysis system 100 may be provided by the same computing device or by any suitable number of different computing devices. If any of the components are implemented using different computing devices, then the components and their respective computing devices may be communicatively coupled, e.g., via a network. Each of the illustrated components (such as the event analysis system 100 and its constituent functionalities) may represent any combination of software and hardware usable to perform their respective functions. It is contemplated that the event analysis system 100 may include additional components not shown, fewer components than shown, or different combinations, configurations, or quantities of the components shown.

Figure 2:
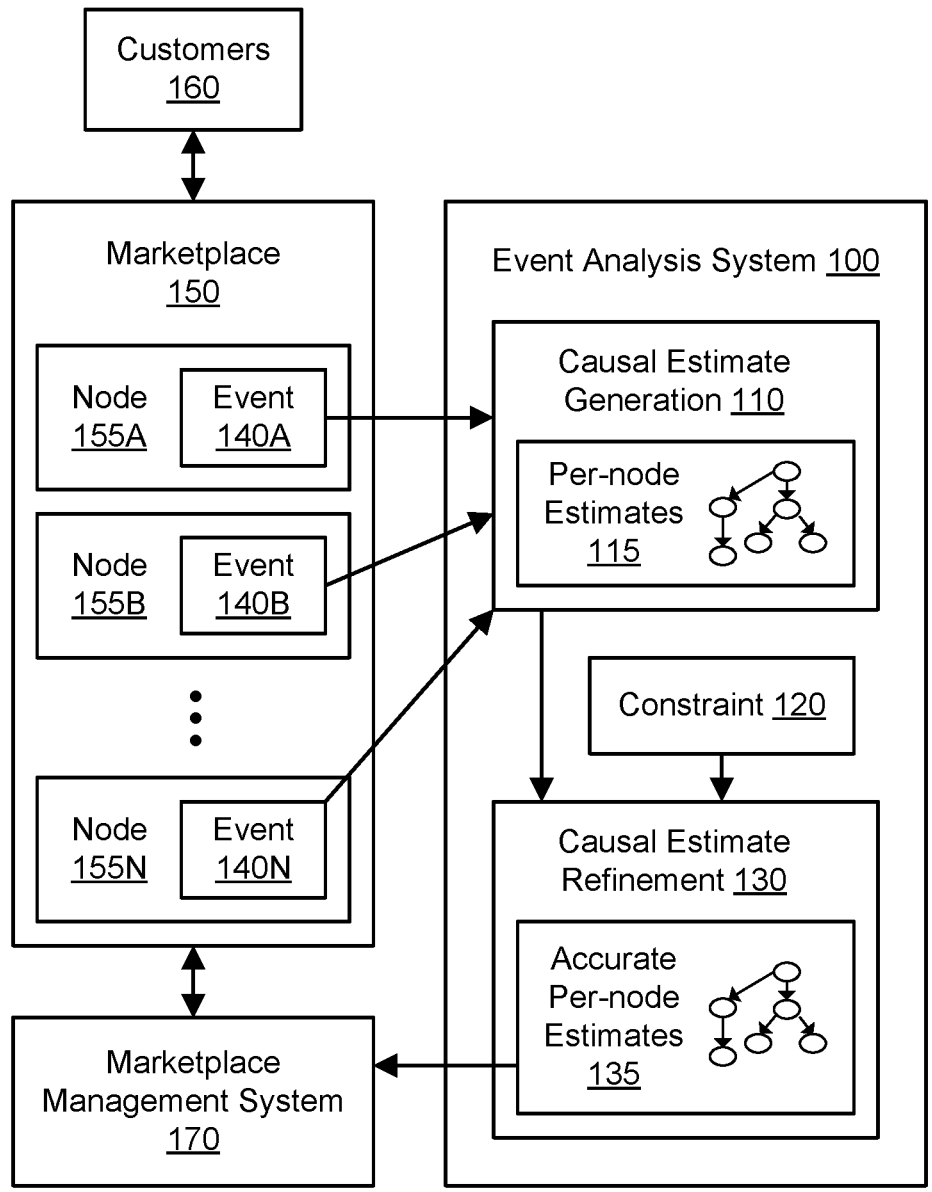
FIG. 2 illustrates further aspects of the example system environment for accurately estimating causal effects for related events, including estimating causal effects for events associated with nodes in a marketplace, according to one embodiment.

FIG. 2 illustrates further aspects of the example system environment for accurately estimating causal effects for related events, including estimating causal effects for events associated with nodes in a marketplace, according to one embodiment. The event analysis system 100 may be managed by or otherwise associated with an online marketplace 150 that offers various goods and services (collectively referred to herein as "items") to customers 160, e.g., via the Internet. The customers 160 may use any type of computing device configurable to interact with the marketplace 150. For example, a customer-operated device may include web browser software that permits the customer to browse product pages and purchase items from the marketplace 150.

Using the event analysis system 100, the causal effects of multiple related events 140A-140N may be estimated together. For example, the events 140A-140N may be related to purchases of items (e.g., products or services) from the online marketplace 150. Customers 160 may interact with the marketplace using a web browser that presents web pages associated with the marketplace. The items for sale in the marketplace may be organized in a hierarchical structure such as a tree. The hierarchy may include parent nodes and child nodes at multiple levels. For example, a parent node associated with electronics may have one child node associated with mobile devices, another child node associated with computers, another child node associated with digital cameras, and so on, while the node for mobile devices may have a child node for smartphones and a child node for tablet devices. As another example, two nodes associated with two different models of a particular brand of smartphone may be siblings that descend from the same parent node. Nodes may be associated with product categories or with individual items for sale. In one embodiment, such nodes may be referred to as browse nodes. Customers may navigate the hierarchy to browse product categories and product pages and to purchase products from individual product pages. The hierarchy may include nodes such as nodes 155A and 155B through 155N, and the nodes may be associated with individual events 140A and 140B through 140N. For example, event 140A may represent a purchase of an item from a browse node 155A, event 140B may represent a purchase of an item from a browse node 155B, and event 140N may represent a purchase of an item from a browse node 155N.

In one embodiment, the downstream impact (DSI) may be estimated for events 140A-140N associated with browse nodes in a hierarchy of items offered via an online marketplace. The downstream impact may represent the causal effect of events 140A-140N. For example, the downstream impact may be estimated in terms of the incremental revenue for the marketplace proprietor as a result of a purchase (e.g., the most recent or $k^{th}$ purchase) in a browse node. In one embodiment, the initial estimates 115 may be determined for each of several nodes (e.g., nodes 155A-155N) in the hierarchy or in a subtree of the hierarchy. In one embodiment, the accurate or adjusted estimates 135 may also be determined for each of several nodes (e.g., nodes 155A-155N) in the hierarchy or in a subtree of the hierarchy (some of which may be produced using a refinement process 130 to satisfy the constraint 120, and some of which may be maintained from the initial estimates if they already satisfy the constraint). The downstream impact of a purchase may be estimated at different granularities with respect to the hierarchy, e.g., for merchandising purposes. For example, for two nodes associated with two different models of a particular brand of smartphone, the downstream impact of purchases of those different (but related) items may be estimated along with the downstream impact of a purchase at their parent node (e.g., a more generic category that represents all models of the particular brand of smartphone). For one example of a constraint 120, estimates of downstream impact may be considered valid if the values for two sibling nodes are within some threshold when compared to one another, e.g., based on the relative similarity of the two sibling nodes as captured in the hierarchy. In one embodiment, the browse node purchase events may not be independent of one another, and the downstream impact of product purchases in various browse nodes may be related to their relative position in the hierarchy. As another example, the downstream impact may be estimated for revenue spent on a marketing channel (e.g., all advertisements for a premium membership at the marketplace) and for its sub-channels (e.g., e-mail advertisements for a premium membership at the marketplace).

A technical problem with prior approaches is that, when the causal effects of events are computed independently of one another, then the computed estimates may not satisfy a constraint 120 and are often invalid due to several sources of bias present in the modeling process. Accordingly, using prior approaches, the causal estimates may be inaccurate when computed independently. In one embodiment, to address this technical problem, the estimates may be computed independently, and then the bias in the estimates may be corrected in a separate step. Using the techniques described herein, the accuracy of estimates of causal effects may be improved. Additionally, although estimates of causal effects for a large number of events may be computed together in a dependent manner, such calculations may be very computationally expensive. Using the techniques described herein, accurate estimates of causal effects may be determined for multiple events with efficient use of computing resources by computing estimates independently and then applying corrections to the estimates. The accurate estimates of causal effects may be used for numerous purposes by other systems, e.g., to modify marketing campaigns or to modify the hierarchy of product categories, in order to make efficient use of time and resources.

In one embodiment, to estimate causal effects of multiple related events, the accuracy of the estimates may be improved by leveraging the event relationships. In one embodiment, unbiased estimates of the causal effects of the corresponding events are mathematically related by some constraint C. In one embodiment, an estimate of the causal effects that satisfies C is defined to be a valid estimate. In one embodiment, an estimate of the causal effects may be deemed a valid estimate based (at least in part) on the lack of bias in the estimate. In one embodiment, the bias in the estimates may be corrected by smoothly perturbing the computed estimates such that they are valid.

In various embodiments, numerous sources of bias may detract from the accuracy of estimates of causal effects (e.g., DSI) of related events. Due to the presence of unobserved latent covariates, the assumption of unconfoundedness of the covariates may not be satisfied, and estimates may be biased on the specific choice of the covariates. Other sources of bias in the estimates may include implementation-specific selection of the control from the larger set of the control population, the propensity model, the choice of the stratification of the treated set (e.g., propensity binning), and so on. Such implementation-specific choices may cause large variations in the causal estimates, and the bias may render the estimates inaccurate and invalid. In one embodiment, bias may be removed from computed estimates of causal effects to make the estimates valid.

In some embodiments, the accurate estimates 135 may be used by other systems in order to control or influence the operation of those systems. As shown in the example of FIG. 2, the accurate estimates 135 may control or influence actions taken by a marketplace management system 170. For example, the marketplace management system 170 may order additional inventory of some items based on the accurate estimates 135, decrease orders for other items to reduce excessive stock of those items, modify a hierarchy of browse nodes representing items to improve sales of those items, modify sales offers and promotions to increase revenue, or otherwise modify the configuration or operation of the marketplace 150. In various embodiments, the estimates may be used in various domains such as climate modeling, medicine, financial modeling, and numerous other fields.

Figure 3:
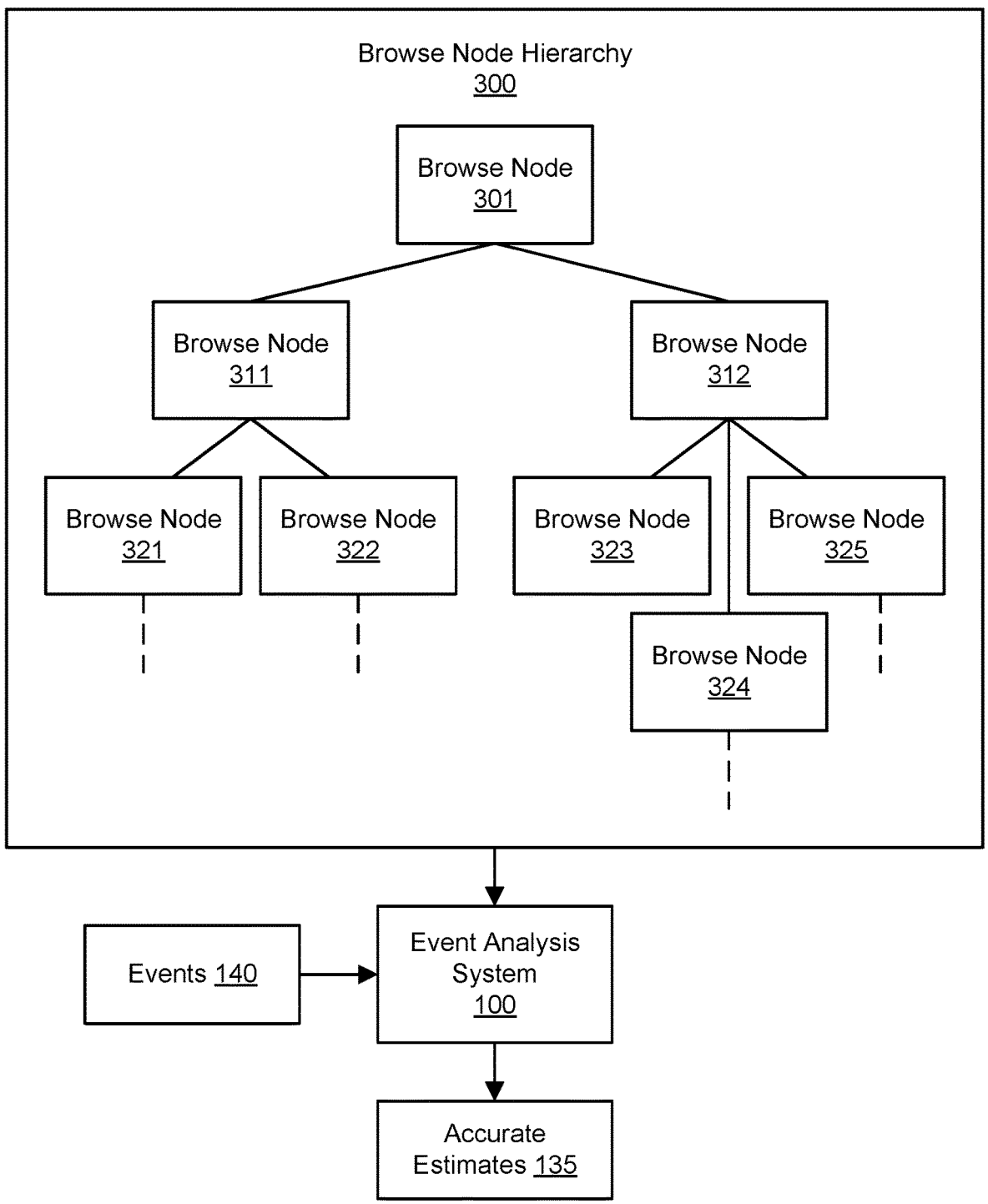
FIG. 3 illustrates further aspects of the example system environment for accurately estimating causal effects for related events, including an example of a browse node hierarchy that informs the generation of accurate estimates, according to one embodiment.

FIG. 3 illustrates further aspects of the example system environment for accurately estimating causal effects for related events, including an example of a browse node hierarchy that informs the generation of accurate estimates, according to one embodiment. In one embodiment, the constraint 120 may be derived from a hierarchy that relates nodes to one another. For example, as shown in FIG. 3, a browse node hierarchy 300 may include a tree structure that represents parent-child relationships between nodes. The nodes may represent browse nodes that are associated with items or item categories in a marketplace 150. For example, a parent node 301 associated with electronics may have one child node 311 associated with mobile devices and another child node 312 associated with computers. The node 311 for mobile devices may have a child node 321 for smartphones and a child node 322 for tablet devices. As another example, further down a subtree from node 321, two nodes associated with two different models of a particular brand of smartphone may be siblings that descend from the same parent node that represents the particular brand. As also shown in the example, the node 312 for computers may have a child node 323 for one brand of computer, another child node 324 for another brand of computer, and yet another child node 325 for yet another brand of computer. The hierarchy 300 may capture one or more relationships or constraints that the estimates of causal effects are expected to satisfy.

Figure 4:
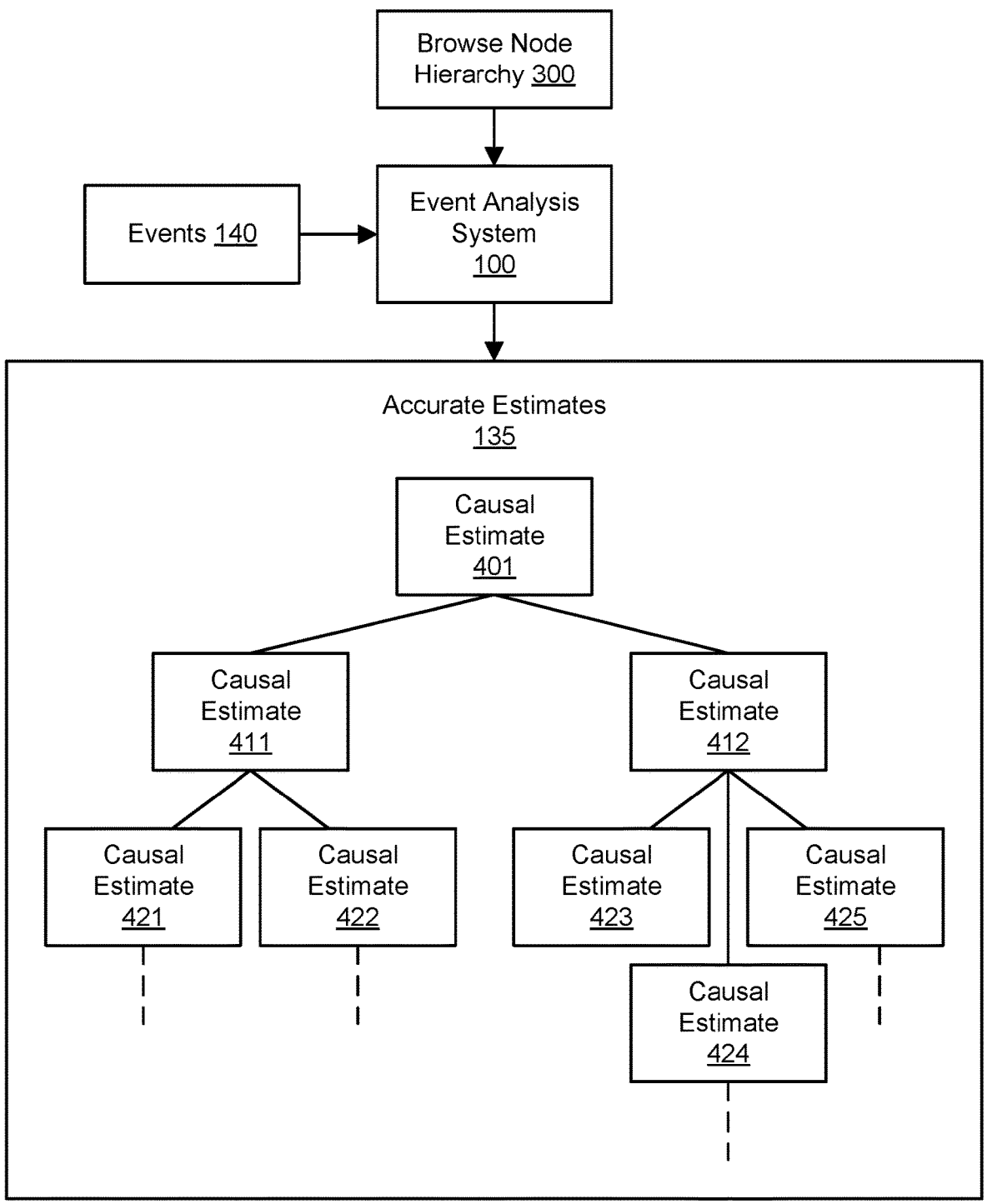
FIG. 4 illustrates further aspects of the example system environment for accurately estimating causal effects for related events, including an example of per-node estimates generates for nodes in a browse node hierarchy, according to one embodiment.

FIG. 4 illustrates further aspects of the example system environment for accurately estimating causal effects for related events, including an example of per-node estimates generates for nodes in a browse node hierarchy, according to one embodiment. Based on this hierarchy 300, the event analysis system 100 may analyze events 140 and generate accurate estimates of the causal effect of events for each of the nodes 301-324. For example, the event analysis system 100 may produce estimates of causal effects of one or more events for each of the nodes 301-324 such that the estimates satisfy a constraint associated with the relative position of nodes within the hierarchy 300. As shown in the example of FIG. 4, the causal estimate 401 may represent an accurate and valid estimate of the causal effect of one or more events for browse node 301. Similarly, the estimate 411 may represent an accurate and valid estimate of the event(s) for browse node 311, the estimate 412 may represent an accurate and valid estimate of the event(s) for browse node 312, the estimate 421 may represent an accurate and valid estimate of the event(s) for browse node 321, the estimate 422 may represent an accurate and valid estimate of the event(s) for browse node 322, the estimate 423 may represent an accurate and valid estimate of the event(s) for browse node 323, the estimate 424 may represent an accurate and valid estimate of the event(s) for browse node 324, and the estimate 425 may represent an accurate and valid estimate of the event(s) for browse node 325. In one embodiment, multiple estimates may be generated for a particular node, e.g., if multiple events are associated with the node. For example, multiple estimates of downstream impact may be generated for repeated purchases of an item associated with a browse node.

In one embodiment, the causal estimates 401-425 may represent the downstream impact (DSI) for events associated with browse nodes 301-325 in a hierarchy 300 of items offered via an online marketplace 150. In one embodiment, the browse node purchase events may not be independent of one another, and the downstream impact of product purchases in various browse nodes may be related to their relative position in the hierarchy. For example, the downstream impact may be estimated in terms of the incremental revenue for the marketplace proprietor as a result of a purchase (e.g., the most recent or kth purchase) in a browse node. The downstream impact of a purchase may be estimated at different granularities with respect to the hierarchy. For example, for the $k^{th}$ purchase of an item at browse node 311, the causal effects of that purchase may be estimated that node as well as for the parent node 301 and the child nodes 321 and 322. In one embodiment, if the constraint 120 is derived from the positions of nodes in the hierarchy 300, then estimates of causal effects for individual nodes may be expected to satisfy that hierarchical relationship, e.g., such that a valid estimate for a parent node represents a weighted average of the estimates for child nodes. For example, because the node 312 is a parent of the nodes 323-325, a valid estimate 412 may represent the weighted average of the estimates 423-425. As another example, the downstream impact may be estimated for revenue spent on a marketing channel (e.g., any advertisement for a premium membership at the marketplace) and for sub-channels (e.g., e-mail advertisements for a premium membership at the marketplace), where the main channel and the sub-channels are represented by a parent node and child nodes.

Figure 5:
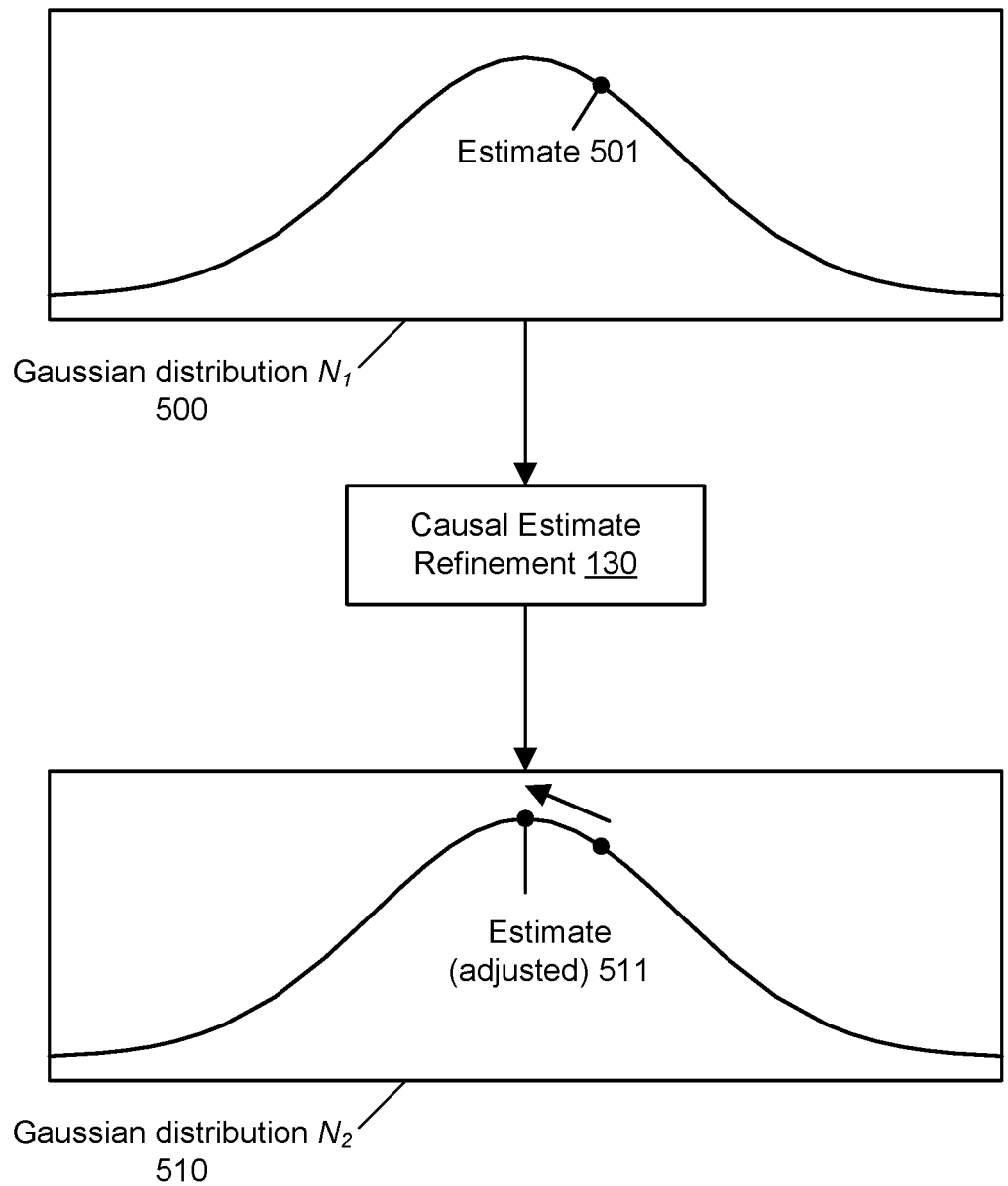
FIG. 5 illustrates further aspects of the example system environment for accurately estimating causal effects for related events, including an example of adjusting estimates within a Gaussian distribution, according to one embodiment.

FIG. 5 illustrates further aspects of the example system environment for accurately estimating causal effects for related events, including an example of adjusting estimates within a Gaussian distribution, according to one embodiment. As will be discussed in detail below, an initial estimate 501 may be assumed to be a sample drawn from a Gaussian distribution 500 that is centered on the valid estimates (whose expected value satisfies a constraint C). To produce the accurate estimate 511, the estimate may be moved within a Gaussian distribution 510 until the constraint C is met. A constraint C may represent a relationship between unbiased (valid) estimates of causal effects of events. In one embodiment, to estimate the downstream impact (DSI) of purchases in browse nodes, the constraint C is derived that relates unbiased DSI estimates of a purchase event (e.g., a repeat purchase event such as the kth purchase event) in parent and children browse nodes. The validity of the DSI estimates may be determined based (at least in part) on the constraint C. If the original estimates are invalid based on C, then modeling techniques may be used to perturb the computed DSI estimates such that they are valid.

In one embodiment, for repeat purchase events in browse nodes, the causal effect of a purchase may be expressed in terms of the incremental revenue to the proprietor of an online marketplace. For example, the increment in revenue may be determined as the average of the difference between a one-year revenue metric (OPS) of the treated set subsequent to the purchase and its control. The treated set may represent the set of customers x who trigger the purchase event e at time t in the event window. For events that a customer can trigger multiple times in the event window, such as the kth or greater purchase in a browse node, the time component t in the treated set may differentiate between two instances of the same customer triggering the same event e.

In one embodiment, for every candidate (x,e,t) in the treated set, the target OPS(x,e,t) may be defined as the one-year OPS of x starting from the time t, right after she triggered event e. Assuming that the covariates do not confound and that the matching between the treated and the control set is ideal, $OPS^c(x,e,t)$ may be defined as the one-year OPS of the control for the treated candidate (x,e,t). The OPS for the control may be computed for a one-year duration starting from time t and with the same covariates as the treated candidate except that the event e has not been triggered. In this scenario, when biases due to imperfect matching and confounding covariates are absent, the downstream impact (DSI) of an event (such as a product purchase) for (x,e,t) may be defined as follows if x does event e at time t in the window, and otherwise as zero:

$$DSI(x,e,t) = OPS(x,e,t) - OPS^c(x,e,t)$$

A relationship between the DSI of a parent browse node P and its children nodes $B^i$, where $i \in [1, \#Children(P)]$, may be determined as follows. For any browse node n, let $n_k$ be the event of the kth purchase in the node n. For a customer x, the purchase history of the customer may be observed as projected along the product identifiers that belong to browse node P. The repeat purchase event $B_j^i$ in the children browse nodes may be observed to simultaneously trigger repeat purchase event $P_k$ in the parent browse node P. There may be a one-to-one and onto function $f_x: i \times j \to k$ such that the $j^{th}$ purchase for x in child browse node $B^j$ is the $k^{th}$ purchase for x in the parent browse node P, such that $DSI(x, B_j^i, t) = DSI(x, P_{f_x(i,j)}, t)$. Because $f_x$ is a one-to-one and onto function, the following equation (referred to herein as the first equation) may be true for the downstream impact:

$$\sum_k \sum_t DSI(x, P_k, t) = \sum_{i,j} \sum_t (x, B_j^i, t)$$

In one embodiment, both $P_k$ and the $B_i^j$ event may be triggered once at most in the event window by customer x. The inner summation over time t in the previous equation, may select the time when x's purchase triggered the $P_k$ or the $B_j^i$ event, respectively. In one embodiment, the downstream impact (DSI) of an event e may be defined as follows, where N(e) represents the number of candidates in the treated set where event e is triggered in the event window (the size of the treatment set for the event e):

$$DSI = \frac{\sum_{x,t} DSI(x,e,t)}{N(e)}$$

In one embodiment, it may then be true that $\sum_{x,t} DSI(x,e,t) = DSI(e) \cdot N(e)$. To sum up the first equation over all customers x, the following equations may be used:

$$\sum_x \sum_k \sum_r DSI(x,P_k,t) = \sum_k \sum_x \sum_r DSI(x,P_k,t) = \sum_k DSI(P_k) \cdot N(P_k)$$

$$\sum_x \sum_{i,j} \sum_r DSI(x,B_j^i,t) = \sum_{i,j} \sum_x \sum_r DSI(x,B_j^i,t) = \sum_{i,j} DSI(B_j^i) \cdot N(B_j^i)$$

Based on the first equation, the two above expressions may be equal, such that:

$$\sum_{i,j} DSI(B_j^i) \cdot N(B_j^i) = \sum_k DSI(P_k) \cdot N(P_k)$$

The above equation may represent the constraint C that unbiased estimates of the downstream impact of repeat purchases in the parent P and the children browse nodes $B^i$ should respect. In one embodiment, estimating confident DSI numbers for events with very large repeat purchase indices (e.g., large values of k and j in the above equation) may become more difficult as the purchase index increases because the treatment size may get smaller. However, such estimates may be less likely to be used by marketing teams due to the lesser value of targeting the repeat-purchasing customers. In one embodiment, the downstream impact of purchase events e may be estimated on an individual basis up to some number R of repeat purchases, and the impact of all repeat purchases greater than R may be combined into a single event $e_{>R}$. With this modification, the above equation may be expressed using a finite sum:

$$\sum_i \sum_{j \in \{1,\ldots,R,>R\}} DSI(B_j^i) \cdot N(B_j^i) = \sum_{k \in \{1,\ldots,R,>R\}} DSI(P_k) \cdot N(P_k)$$

In one embodiment, a single customer x can trigger the event $e_{>R}$ multiple times in the event window, such as with repeated purchases in a browse node in the event window. In one embodiment, while estimating the DSI of event $e_{>R}$, each occurrence of a browse node purchase beyond R by a customer in the event window may be considered as a separate treatment unit. In one embodiment, the treatment outcome for this unit may be the one-year OPS starting from the corresponding browse node purchase greater than R.

In one embodiment, $\widehat{DSI}(e)$ may represent an estimate of the downstream impact for the event e. In one embodiment, an estimate of the downstream impact for events $P_k$ and the $B_j^i$ is valid if and only if $\sum_{i,j} \widehat{DSI}(B_j^i) \cdot N(B_j^i) - \sum_k \widehat{DSI}(P_k) \cdot N(P_k) = 0$, for $j, k \in \{1,\ldots,R,>R\}$. In one embodiment, if the computed estimates of the downstream impact are invalid (e.g., due to bias) when computed independently for all purchase events, the computed DSI estimates may be smoothly perturbed such that they are valid. To estimate the causal effects for repeat purchase events independently, let $d_e$ and $\sigma_e$ be the DSI estimate obtained for event e and its observed standard deviation, respectively. As discussed above, the estimate $d_e$ may be invalid, e.g., if it does not satisfy the constraint C. Given the observables $d_e$ and $\sigma_e$, the following model may be assumed:

$$d_e \sim N_1(\mu_e, \sigma_e^2), \mu_e \sim N_2(v_e, \sigma^2)$$

The Gaussian distribution $N_2$ 510 may represent probabilistically the space of all valid estimates. The value $\mu_e$ may represent a sample drawn from $N_2$, and the observed estimate $d_e$ (e.g., estimate 501 in FIG. 5) may represent a sample drawn from $N_1$ 500 that is centered around $\mu_e$ and has standard deviation $\sigma_e$. In one embodiment, instead of $d_e$, the expected value of $\mu_e$ may be vended out under the posterior distribution such that the expected value of $\mu_e$ forms a valid estimate and the log likelihood of the observed estimate $d_e$ is maximized. In one embodiment, a may represent a tunable hyper-parameter that can be interpreted as controlling the distribution of valid estimates in the solution space. In one embodiment, the following may be observed:

$$(\mu_e | d_e, \sigma_e^2, v_e, \sigma^2) \propto (P(d_e | \mu_e, \sigma_e^2) \cdot P(\mu_e | v_e, \sigma^2) \propto N(\mu_e, \sigma_e^2) \cdot N(v_e, \sigma^2) \propto N(\alpha_e, \beta_e^2),$$

$$\text{where } \alpha_e = \frac{d_e \sigma^2 + v_e \sigma_e^2}{\sigma_e^2 + \sigma^2} \quad \frac{1}{\beta_e^2} = \frac{1}{\sigma^2} + \frac{1}{\sigma_e^2}$$

The posterior distribution of $\mu_e$ may represent a Gaussian distribution with mean $\alpha_e$ and variance $\beta_e^2$. The expected value of $\mu_e$ under the posterior distribution may be $\alpha_e$. As discussed above, $\alpha_e$ may be constrained such that it forms a valid estimate where the validity constraint C is satisfied when the DSI estimate $\widehat{DSI}(e)$ is substituted by $\alpha_e$–$C(\alpha_e | \widehat{DSI}(e)) = 0$. By integrating out $\mu_e$ from the Gaussian distributions $N_1$ and $N_2$, the following may be obtained:

$$d_e \sim N(v_e, \sigma^2 + \sigma_e^2)$$

Maximizing the log-likelihood of the observed estimates $d_e$ may yield the following optimization: $v_e$ such that $$\frac{1}{2} \cdot \sum_e \frac{(v_e - d_e)^2}{\sigma_e^2 + \sigma^2}$$

is minimized. Such an approach may represent a constrained convex optimization problem with a linear equality constraint, and it may be solved by setting the derivative of the lagrangian of the problem to zero. The solution may result in $v_e$ that can be used to compute the new DSI estimates $\alpha_e$:

minimize $$\frac{1}{2} \cdot \sum_e \frac{(v_e - d_e)^2}{\sigma_e^2 + \sigma^2},$$

such that $C(\alpha_e | \widehat{DSI}(e)) = 0$

In one embodiment, when $\sigma = \infty$, all valid solutions may be uniformly distributed. In such a scenario, $\alpha_e = d_e$ and the validity of $\alpha_e$ may imply that $d_e$ is a valid solution. In one embodiment, $\sigma = \infty$ may indicate a lack of bias. In one embodiment, if the observed estimates $d_e$ are invalid, $\sigma=\infty$ may be forbidden by the model used to correct bias. On the other extreme, if $\sigma=0$, then there may be no uncertainty in the space of valid solutions, and $v_e$ may be the only valid solution. In one embodiment, $\alpha_e = v_e$ may be vended out such that $v_e$ respects the validity constraint C and such that the squared distance between $v_e$ and $d_e$ inversely weighted by the variance term $\sigma_e^2$ is minimized. In one embodiment, the $$\frac{1}{\sigma_e^2}$$

term in the optimization function may ensure that estimates that have high variance are perturbed more than estimates that have smaller variance. In one embodiment, the variance $\beta_e^2$ for the posterior distribution of $\mu_e$ may be zero as there is no uncertainty in the space of valid estimates.

In one embodiment, the techniques described herein for generating accurate estimates of causal effects of events may be applied to nodes of a tree or subtree with a single level of parent-child hierarchy. In one embodiment, the techniques described herein for generating accurate estimates of causal effects of events may be applied to nodes of a tree or subtree with multiple levels of parent-child hierarchy. For multiple levels, C may represent a linear constraint given by a matrix of dimensionality M×(N×+1)), where M is the number of internal nodes in the tree and N is the total number of browse nodes.

In one embodiment, a parameter $v_e$ may be used for each event e. For a repeat purchase event in browse nodes, to reduce the number of parameters, an alternate model may be used where $\mu_e$ for all repeat purchase events in the same browse node are drawn from the same Gaussian distribution. Such an approach may limit the number of parameters to the number of browse nodes instead of the number of events.

Figure 6:
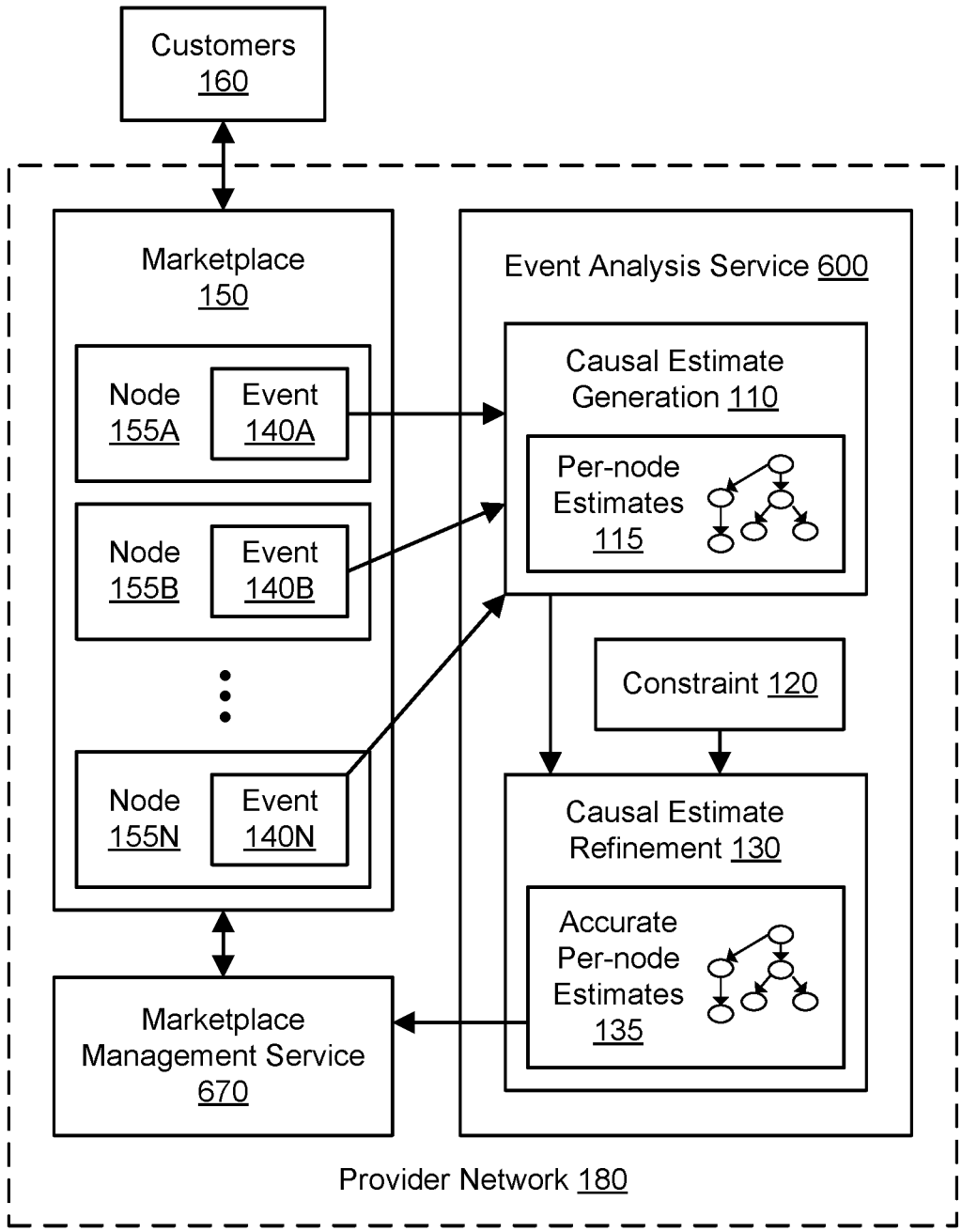
FIG. 6 illustrates further aspects of the example system environment for accurately estimating causal effects for related events, including providing the generation of accurate estimates using a service in a provider network, according to one embodiment.

FIG. 6 illustrates further aspects of the example system environment for accurately estimating causal effects for related events, including providing the generation of accurate estimates using a service in a provider network, according to one embodiment. The functionality of the event analysis system 100 may be offered as an event analysis service 600. Similarly, the functionality of the marketplace management system 170 may be offered as a marketplace management service 670. The service 600 and/or service 670 may be implemented in a service-oriented system with a plurality of services that interact with one another according to a service-oriented architecture. The functionality of the service 600 and/or service 670 may be invoked using appropriate calls to a service interface exposed by the respective service, e.g., an application programming interface (API) or other programmatic interface. The functionality of a service may be invoked by another service or by a user. For example, the functionality of the event analysis service 600 may be invoked by the marketplace management service 670, or vice versa. As another example, the event analysis service 600 may invoke the functionality of another service that performs the causal estimate generation 110. In one embodiment, the event analysis service 600 may be invoked by an application programming interface (API) that takes as input the covariates and the target of the treatment and control of multiple events along with the constraint 120 that relates the causal estimates of the events. The service 600 may then output the improved, constraint-satisfying, bias-corrected estimates 135 of the events.

As discussed above, the event analysis service 600 may produce accurate estimates 135 that may control or influence the operation of other entities. As shown in the example of FIG. 6, the accurate estimates 135 may control or influence actions taken by the marketplace management service 670. For example, based on the accurate estimates 135, the marketplace management service 670 may order additional inventory of some items, decrease orders for other items to reduce excessive stock, modify a hierarchy of browse nodes representing items to improve sales of those items, modify sales offers and promotions to increase revenue, select items for targeted marketing to customers, sort items for search results such that more impactful items are closer to the top of the results, and so on.

The service 600 and service 670 may be implemented in a provider network 180 along with the marketplace 150. The provider network 180 may be operated by an entity such as a business or a public-sector organization to provide resources and/or services (such as services 600 and 670 as well as various types of cloud-based computing or storage services) to a distributed set of clients via the Internet and/or other networks. The provider network 180 may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 180 in different embodiments, including computer servers, storage devices, network devices, and the like. In one embodiment, clients of the service 600 may be internal to the provider network 180, such as other services or entities associated with the marketplace 150. In one embodiment, clients of the service 600 may be external to the provider network 180, such as external entities unrelated to the marketplace 160 who may seek to.

In one embodiment, the provider network 180 may implement a flexible set of resource reservation, control, and access interfaces for clients. For example, the provider network 180 may implement a programmatic resource reservation interface (e.g., via a web site or a set of web pages) that allows clients to learn about, select, purchase access to, and/or reserve resources. In one embodiment, resources may be reserved on behalf of clients using a client-accessible service. In one embodiment, the provider network 180 may execute tasks on behalf of clients using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

In one embodiment, service 600 and/or service 670 may be configured to generate network-based service requests according to a Representational State Transfer (REST)-style network-based services architecture, a document- or message-based network-based services architecture, or another suitable network-based services architecture. In at least some embodiments, service 600 and/or service 670 may provision, mount, and configure storage volumes implemented at storage services for file systems implemented at the corresponding computing devices. In one embodiment, service 600 and/or service 670 may communicate via a network. In various embodiments, the network may encompass any suitable combination of networking hardware and protocols necessary to establish network-based communications between services. For example, the network may generally encompass the various telecommunications networks and service providers that collectively implement the Internet. The network may also include private networks such as local area networks (LANs) or wide area networks (WANs) as well as public or private wireless networks. In one embodiment, the network may include the hardware (e.g., modems, routers, switches, load balancers, proxy servers, etc.) and software (e.g., protocol stacks, accounting software, firewall/security software, etc.) necessary to establish a networking link between a client and the Internet as well as between the Internet and a service.

Figure 7:
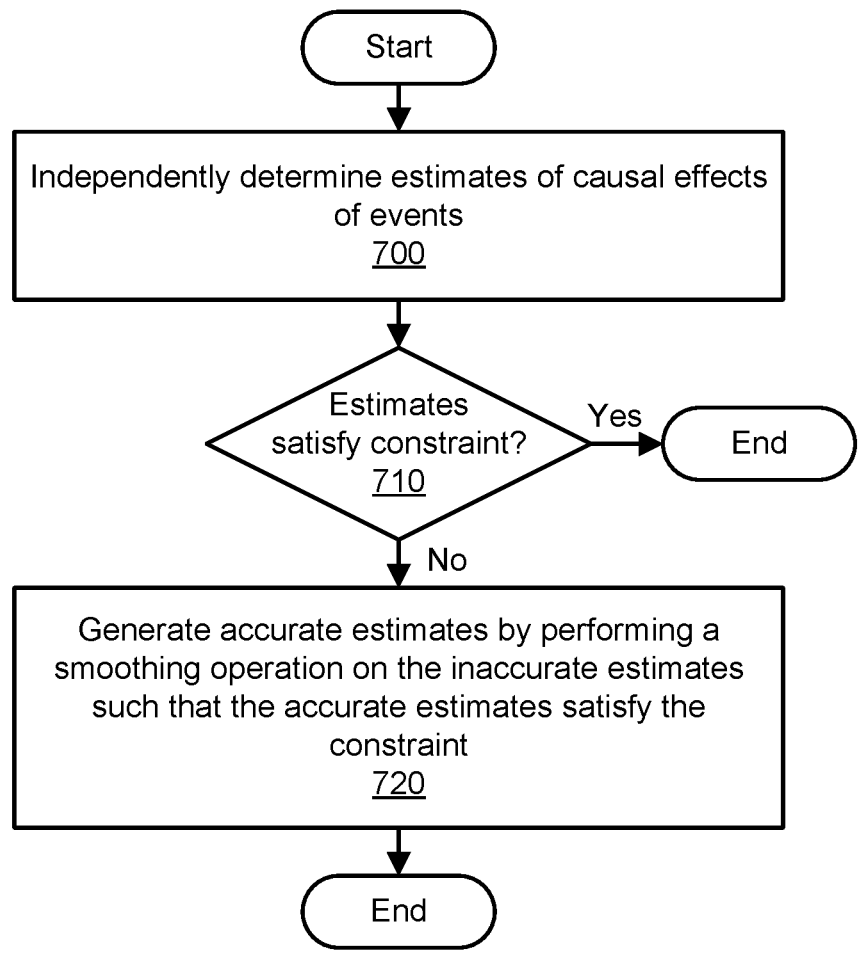
FIG. 7 is a flowchart illustrating a method for accurately estimating causal effects for related events, according to one embodiment.

FIG. 7 is a flowchart illustrating a method for accurately estimating causal effects for related events, according to one embodiment. As shown in 700, the estimates of causal effects of one or more events may be determined. The causal effects may be determined independently of one another. In one embodiment, the causal effect of an event may be determined for each of a plurality of nodes in a tree or subtree. For example, events may be related to purchases of items (e.g., products or services) from an online marketplace. The items for sale in the marketplace may be organized in a hierarchical structure such as a tree. For example, a parent node associated with electronics may have one child node associated with mobile devices, another child node associated with computers, another child node associated with digital cameras, and so on, while the node for mobile devices may have a child node for smartphones and a child node for tablet devices. As another example, two nodes associated with two different models of a particular brand of smartphone may be siblings that descend from the same parent node. The estimates of causal effects of events determined in 700 may represent initial estimates, and at least some of them may be biased, inaccurate, and invalid. Inaccuracies in initial estimates may be due to various sources of bias, such as the presence of unobserved latent covariates, implementation-specific modeling choices such as the selection of the control from the larger set of the control population, propensity modeling, and so on. The causal effects may represent the downstream impact of events, and the downstream impact may be estimated in terms of the incremental revenue for the marketplace proprietor as a result of a purchase (e.g., the most recent or $k^{th}$ purchase) in a browse node.

As shown in 710, it may be determined whether an estimate satisfies a constraint. The constraint may capture a relationship among the causal estimates. For example, if the constraint is derived from the positions of nodes in a tree (or other hierarchical structure), then estimates of causal effects for individual nodes may be expected to satisfy that hierarchical relationship. For example, a constraint may be satisfied if a valid estimate for a parent node represents a weighted average of the estimates for its child nodes. As another example, for two nodes associated with two different models of a particular brand of electronics, the downstream impact of purchases of those different (but related) items may be estimated along with the downstream impact of a purchase at their parent node (e.g., a more generic category that represents all models of the particular brand of smartphone); the estimates of downstream impact may be considered valid if the values for two sibling nodes are within some threshold when compared to one another, e.g., based on the relative similarity of the two sibling nodes as captured in the hierarchy. In one embodiment, the constraint may be specified by a user. In one embodiment, the constraint may be determined using a machine learning process. If the constraint is met, then the initial estimate may be produced as output without undergoing an adjustment or refinement process.

If the constraint is not met, then as shown in 720, one or more accurate estimates may be generated that satisfy the constraint. An accurate estimate may be generated by performing a Bayesian smoothing operation on the corresponding inaccurate estimate. An accurate estimate may have improved accuracy with respect to the corresponding initial estimate. In one embodiment, the initial estimates may be assumed to be a sample drawn from a Gaussian distribution centered on the valid estimates (whose expected value satisfies the constraint). To produce an accurate estimate, a value may be moved within a Gaussian distribution until the constraint is met. Using the method shown in FIG. 7, the accuracy of estimates of causal effects may be improved. Using the method shown in FIG. 7, accurate estimates of causal effects may be determined for multiple events with efficient use of computing resources by computing estimates independently and then applying corrections to the estimates. The accurate estimates of causal effects may be used for numerous purposes by other systems, e.g., to modify marketing campaigns or to modify the hierarchy of product categories, in order to make efficient use of time and resources.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a network-based event analysis system, wherein the event analysis system is configured to:
determine a plurality of estimates of causal effects of a plurality of events, wherein the estimates are determined for a plurality of browse nodes in a hierarchy of browse nodes, wherein different ones of the browse nodes correspond to respective ones of the events, and wherein the estimates are determined independently;
determine:

a first subset of the estimates that do not satisfy a constraint associated with a relationship among the causal effects, wherein the relationship is based at least in part on the hierarchy of browse nodes; and a second subset of the estimates that satisfy the constraint;

separately from the independent determination of the estimates, generate a set of accurate estimates, wherein to generate the set of accurate estimates comprises:

apply a Bayesian smoothing only to respective ones of the first subset of the estimates to form a Bayesian smoothed first subset of the estimates that satisfy the constraint; and combine the Bayesian smoothed first subset of the estimates and the second subset of the estimates to form the set of accurate estimates, wherein the accurate estimates satisfy the constraint and are generated more computationally efficiently than if computed together in a dependent manner; and based on the generated set of accurate estimates, communicate over a network with another network-based system to control at least in part, one or more actions taken by the other network-based system including modification of the hierarchy of browse nodes.

2. The system as recited in claim 1, wherein the events comprise a parent event and a plurality of child events, and wherein an accurate estimate for the parent event represents a weighted average of estimates for the child events.

3. The system as recited in claim 1, wherein, in generating the set of accurate estimates, the subset of the estimates are adjusted within a Gaussian distribution until the constraint is satisfied.

4. The system as recited in claim 1, wherein the event analysis system is configured to:

modify a configuration of an online marketplace based at least in part on the accurate estimates.

5. A computer-implemented method, comprising:

performing, by a network-based event analysis system:

determining a plurality of estimates of causal effects of a plurality of events, wherein the estimates are determined independently;

determining:

a first subset of the estimates that do not satisfy a relationship among the causal effects, the relationship based on a hierarchy of browse nodes, wherein different ones of the browse nodes correspond to respective ones of the events; and a second subset of the estimates that satisfy the relationship;

separately from independently determining the estimates, generating a set of accurate estimates, comprising:

applying a smoothing process only to respective ones of the first subset of the estimates to form a Bayesian smoothed first subset of the estimates that satisfy the relationship; and including the Bayesian smoothed first subset of the estimates and the second subset of the estimates to form the set of accurate estimates, wherein the accurate estimates satisfy the relationship and are generated more computationally efficiently than if computed together in a dependent manner; and based on the generated set of accurate estimates, communicating over a network with another network-based system to control at least in part, one or more actions taken by the other network-based system including modifying the hierarchy of browse nodes.

6. The method as recited in claim 5, wherein the events represent transactions associated with the browse nodes in the hierarchy, wherein the estimates are determined for the browse nodes in the hierarchy, and wherein the relationship is associated with positions of the browse nodes in the hierarchy.

7. The method as recited in claim 5, wherein the events comprise a parent event and a plurality of child events, and wherein an accurate estimate for the parent event represents a weighted average of estimates for the child events.

8. The method as recited in claim 5, wherein the causal effects represent downstream impact of transactions.

9. The method as recited in claim 5, wherein the relationship is determined based at least in part on user input.

10. The method as recited in claim 5, wherein, in generating the set of accurate estimates, the subset of the estimates are adjusted within a Gaussian distribution until the relationship is satisfied.

11. The method as recited in claim 5, wherein the accurate estimates are generated using a service in a service-oriented system, and wherein the relationship is provided as input to the service.

12. The method as recited in claim 5, further comprising:

modifying a sorting of items in search results of an online marketplace based at least in part on the accurate estimates.

13. A non-transitory computer-readable storage medium storing program instructions computer-executable to implement a network-based event analysis system to perform:

determining a plurality of estimates of causal effects of a plurality of events, wherein the estimates are determined independently;

determining:

a first subset of the estimates that do not satisfy a relationship among the causal effects, the relationship based on a hierarchy of browse nodes, wherein different ones of the browse nodes correspond to respective ones of the events; and a second subset of the estimates that satisfy the relationship;

separately from independently determining the estimates, generating a set of accurate estimates, comprising:

applying a Bayesian smoothing process only to respective ones of the first subset of the estimates to form a Bayesian smoothed first subset of the estimates that satisfy the relationship; and including the Bayesian smoothed first subset of the estimates and the second subset of the estimates to form the set of accurate estimates, wherein the accurate estimates satisfy the relationship and are generated more computationally efficiently than if computed together in a dependent manner; and based on the generated set of accurate estimates, communicating over a network with another network-based system to control at least in part, one or more actions taken by the other network-based system including modifying the hierarchy of browse nodes.

14. The non-transitory computer-readable storage medium as recited in claim 13, wherein the events represent transactions associated with the browse nodes in the hierarchy of browse nodes, wherein the estimates are determined for the browse nodes in the hierarchy of browse nodes, and wherein the relationship is associated with positions of the browse nodes in the hierarchy of browse nodes.

15. The non-transitory computer-readable storage medium as recited in claim 13, wherein the events comprise a parent event and a plurality of child events, and wherein an accurate estimate for the parent event represents a weighted average of estimates for the child events.

16. The non-transitory computer-readable storage medium as recited in claim 13, wherein the causal effects represent downstream impact of transactions.

17. The non-transitory computer-readable storage medium as recited in claim 13, wherein the relationship is determined based at least in part on user input.

18. The non-transitory computer-readable storage medium as recited in claim 13, wherein, in generating the set of accurate estimates, the subset of the estimates are adjusted within a Gaussian distribution until the relationship is satisfied.

19. The non-transitory computer-readable storage medium as recited in claim 13, wherein the accurate estimates are generated using a service in a service-oriented system, and wherein the relationship is provided as input to the service.

20. The non-transitory computer-readable storage medium as recited in claim 13, wherein the program instructions are further computer-executable to perform:
    modifying a product inventory of an online marketplace based at least in part on the accurate estimates.

\* \* \* \* \*